(12) United States Patent
Aso et al.

(10) Patent No.: US 8,581,140 B2
(45) Date of Patent: Nov. 12, 2013

(54) LASER PROCESSING APPARATUS, LASER PROCESSING HEAD AND LASER PROCESSING METHOD

(75) Inventors: Kosei Aso, Kanagawa (JP); Yoshinari Sasaki, Tokyo (JP); Hidehisa Murase, Kanagawa (JP); Naoki Yamada, Kanagawa (JP)

(73) Assignees: Sony Corporation, Tokyo (JP); Exitech Limited, Oxford (GB)

( * ) Notice: Subject to any disclaimer, the term of this patent is extended or adjusted under 35 U.S.C. 154(b) by 1598 days.

(21) Appl. No.: 11/467,407

(22) Filed: Aug. 25, 2006

(65) Prior Publication Data

US 2007/0210045 A1 Sep. 13, 2007

(30) Foreign Application Priority Data

Mar. 7, 2006 (JP) ................. 2006-061561

(51) Int. Cl.
*B23K 26/14* (2006.01)
*B23K 26/12* (2006.01)
*B23K 26/36* (2006.01)

(52) U.S. Cl.
CPC ........... *B23K 26/1476* (2013.01); *B23K 26/123* (2013.01); *B23K 26/367* (2013.01)
USPC ............... 219/121.67; 219/121.68; 219/121.7

(58) Field of Classification Search
USPC ..................................... 219/121 L, 68, 70, 72
See application file for complete search history.

(56) References Cited

U.S. PATENT DOCUMENTS

| 4,027,137 | A | * | 5/1977 | Liedtke | ....................... 219/121.7 |
| 5,220,149 | A | * | 6/1993 | Neidhardt | ................. 219/121.67 |
| 5,674,328 | A | | 10/1997 | Mannava et al. | |
| 5,756,965 | A | | 5/1998 | Mannava | |
| 2003/0127435 | A1 | | 7/2003 | Voutsas | |
| 2004/0226927 | A1 | * | 11/2004 | Morikazu et al. | ........ 219/121.84 |

FOREIGN PATENT DOCUMENTS

| JP | 10-099978 | 7/1997 |
| JP | 9192870 | 7/1997 |
| JP | 10-099978 | 4/1998 |
| JP | 2004153171 | 5/2004 |

(Continued)

OTHER PUBLICATIONS

Japanese Office Action issued Nov. 22, 2011, for corresponding Japanese Appln. No. 2006-061561.

(Continued)

*Primary Examiner* — Henry Yuen
*Assistant Examiner* — Thien S Tran
(74) *Attorney, Agent, or Firm* — K&L Gates LLP (57) ABSTRACT

A laser processing apparatus is provided. The laser processing apparatus includes a laser processing head having a transmission window, an opening portion, an outlet hole, a first vent hole and a second vent hole. The transmission window transmits laser light by which a processing object is irradiated. The opening portion passes the transmitted laser light to a bottom portion of the laser processing head. The outlet hole discharges an atmosphere in the vicinity of a laser light irradiation region of the processing object to the outside. The first vent hole directs gas into the vicinity of the laser light irradiation region. The second vent hole discharges the atmosphere in the vicinity of the laser light irradiation region. Debris generated from the processing object is discharged from the outlet hole and the second vent hole that are continuous with the opening portion provided at the bottom portion of the laser processing head.

5 Claims, 6 Drawing Sheets

(56) References Cited

FOREIGN PATENT DOCUMENTS

| | | |
|---|---|---|
| JP | 2004230458 | 8/2004 |
| WO | 2005/118210 A1 | 12/2005 |
| WO | 2005-120763 | 12/2005 |
| WO | WO 2005/118210 A1 * 12/2005 ............. B23K 26/14 |
| WO | WO 2005/120763 A2 * 12/2005 ............. B23K 26/00 |

OTHER PUBLICATIONS

Japanese Office Action issued Jun. 12, 2012, for corresponding Japanese Appln. No. 2006-061561.

\* cited by examiner

← Gas Flow Direction

LASER PROCESSING APPARATUS, LASER PROCESSING HEAD AND LASER PROCESSING METHOD

CROSS REFERENCES TO RELATED APPLICATIONS

The present application claims priority to Japanese Patent Application JP 2006-61561 filed in the Japanese Patent Office on Mar. 7, 2006, the entire contents of which is being incorporated herein by reference.

BACKGROUND

The present application relates to technology for performing pattern processing on a transparent conductive film that is used for a transparent electrode on a multilayer thin film of a FPD (Flat Panel Display) and the like. Particularly the present application relates to a laser processing apparatus, a laser processing head and a laser processing method for removing and extracting debris that is particles and products generated during laser processing based on ablation, thermofusion, or composite action thereof in which a surface of a processing object is irradiated with laser light.

A transparent conductive film is used as a transparent electrode of an array substrate (multilayer film substrate) for a flat display panel, of a solar cell and the like. Also a transparent conductive film is widely adopted as a transparent electrode in the field of electronic paper whose development has been promoted as a future display device, and the use thereof has been expanded. Further, since competition for higher definition and lower costs of a display has become more intensive recently, a transparent conductive film of higher quality and higher productivity may also be required in manufacturing.

Such transparent conductive film is typically patterned into a desired shape by a photolithography method. For example, a transparent conductive film made of an ITO (Indium Tin Oxides) film, a ZnO (Zinc Oxides) film or the like is vacuum-coated on a glass, plastic, or silicon wafer substrate or the like, then a resist layer is formed thereon to obtain a multilayer thin film. The resist layer is exposed by irradiation of light through a photomask having a predetermined pattern. The photomask pattern is transcribed onto the resist layer by performing development and post bake, then a portion of the transparent conductive film not covered with the resist is removed by an etching method, and the remaining resist layer is removed at the end so that the desired pattern of the transparent conductive film is obtained.

However, the photolithography process described above needs a large scale apparatus such as a coater/developer, which discourages manufacturing costs from being reduced. In addition, since a large amount of chemical solution such as developing solution is used, there is also caused a problem in view of environmental preservation. Furthermore, a low-temperature polysilicon liquid crystal display of reflective and transmissible type, for example, includes an ITO film used as a transmissible portion of a pixel electrode and an Al film or the like used as a reflective film on a substrate provided with a TFT (Thin Film Transistor). In this case, the photolithography process is needed twice since the resist and development solution are different even if the same pattern form is used in each patterning. Accordingly, in order to simplify a manufacturing process by omitting additional photolithography processing, Japanese Published Patent Application No. 2004-153171, for example, discloses technology for directly processing a transparent conductive film by using laser light.

In the above-described direct processing of a transparent conductive film by using a laser, a short wavelength laser such as an excimer laser, for example, is used. Typically, an excimer laser (excited dimmer laser) has high photon energy capable of cutting a chemical bond, and in photochemical decomposition and photothermal decomposition process called ablation using a short pulse laser of short wavelength, a processing object can be removed and minutely processed while suppressing thermal effect. Attention is focused on such laser processing technology based on the ablation. With irradiation of excimer laser light whose energy density is adjusted, various materials such as plastics (polymeric materials), metals and ceramics can be ablated.

In the ablation processing using a laser, ablation products generated from a surface of a processed object irradiated by the laser light may re-deposit around a processed region. Those ablation products are typically called debris. When re-deposition of the debris occurs around the processed region, there is a possibility that desired processing quality and processing accuracy may not be obtained. Hence, a method of reducing debris has been studied.

For example, a method (hereinafter, referred to as method 1) is proposed, in which a fluid feed apparatus for directing a fluid such as air onto a surface in the vicinity of a processed region is provided and a suction duct for sucking the fluid is installed on the opposite side to a fluid feeding nozzle. In this method 1, debris is blown away from the processed region and simultaneously is sucked and removed (see, Japanese Published Patent Application No. 10-99978).

Further, it is known that blowing an assist gas around a laser light irradiated region together with irradiation of laser light onto the processing object is efficient for reducing an amount of debris generated. A method (hereinafter, referred to as method 2) is proposed, in which a laser processing head includes an inner side nozzle and an outer side nozzle arranged surrounding an outer circumferential surface thereof are disposed. In this method 2, an assist gas is directed toward a processed region from the inner side nozzle, and debris is extracted by sucking the assist gas using the outer side nozzle (see, Japanese Published Patent Application No. 09-192870). Further, a method of decomposing debris or preventing re-deposition thereof by using a predetermined atmospheric gas is known as a method of controlling generation itself of debris. Furthermore, it is known that an amount of debris deposited on the processed object can be greatly reduced by performing the laser processing under low pressure conditions of about 10[Pa] ($10^{-2}$ Torr).

Figure 1:
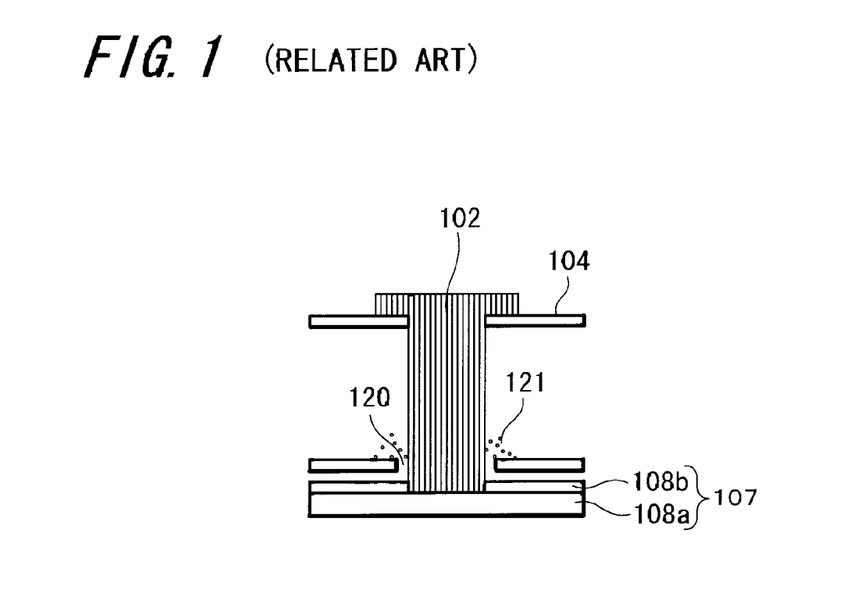
FIG. 1 is a cross-sectional view in the vicinity of an opening portion in a related art laser processing apparatus.

Further, as shown in FIG. 1, a method (hereinafter, referred to as method 3) is proposed, in which an opening portion 120 is provided right above a processing object 107 having a transparent conductive film 108b laminated on a substrate 108a, for example. In this method 3, a discharge device is provided to reduce the pressure of a region surrounded by a mask or variable aperture 104 and the opening portion 120 as a closed space portion, and so debris generated by radiation of laser light 102 on the processing object 107 is discharged and also debris 121 deposits on the opening portion 120 without depositing on the processing object 107 (see, Japanese Published Patent Application No. 2004-230458).

However, debris is scattered even when suction and discharge thereof is attempted by blowing off the debris on the surface in the vicinity of the processed region as described in the method 1, and therefore it has been difficult to completely remove and extract the debris even if suction power is raised.

In addition, debris is scattered and deposits again around the processed region even when an assist gas is blown onto the processed region from the inner side nozzle as described in the method 2, and therefore it has been difficult to sufficiently remove the debris even if suction power of the outer side nozzle is increased.

Moreover, debris may not necessarily deposit at the opening portion even if pressure is reduced inside the closed space portion provided with the opening portion as described in the method 3, and therefore there has been such a problem that the debris in the center portion of the processed region re-deposits on the surface of the processing object.

In view of the problems heretofore described, there is a need for efficiently removing and extracting debris generated from laser processing, thereby reducing debris deposited on a processing object.

SUMMARY

According to an embodiment, there is provided a laser processing apparatus for performing pattern processing of a transparent conductive film on a multilayer film formed on a processing object by using laser light, including a laser processing head that has a transmission window, an opening portion, an outlet hole, a first vent hole and a second vent hole. The transmission window transmits laser light by which the processing object is irradiated. The opening portion passes the laser light transmitted through the transmission window to a bottom portion of the laser processing head. The outlet hole discharges an atmosphere in the vicinity of a laser light irradiated region of the processing object to the outside. The first vent hole directs gas into the vicinity of the laser light irradiated region of the processing object, and the second vent hole is provided at a position opposed to the first vent hole and discharges the atmosphere in the vicinity of the laser light irradiated region of the processing object. In the laser processing apparatus according to an embodiment, debris generated from the laser light irradiated region of the processing object is discharged from the outlet hole and the second vent hole which are continuous with the opening portion provided at the bottom portion of the laser processing head.

According to the above-described configuration, since the vicinity of the laser light irradiated region can be brought into a decompressed atmosphere using a simplified configuration, debris generated by the laser processing can be removed and extracted efficiently.

Further, according to an embodiment, there is provided a laser processing method of performing pattern processing of a transparent conductive film on a multilayer film formed on a processing object by using laser light includes the following steps of (A) to (E):

(A) a step of directing gas into the vicinity of a laser light irradiated region of the processing object;

(B) a step of irradiating the processing object by first laser light;

(C) a step of moving a stage for mounting the processing object by a predetermined distance in the direction opposite to a flow of the gas;

(D) a step of discharging an atmosphere in the vicinity of the laser light irradiated region of the processing object; and (E) a step of irradiating the processing object by second laser light during the discharge of the atmosphere in the vicinity of the laser irradiated region such that a first irradiated region by the first laser light is partially overlapped with a second irradiated region by the second laser light.

According to the above, by forming a gas flow in one direction in the vicinity of the laser light irradiated region debris is collected in a desired region. Further, irradiation of the laser light is performed such that the first irradiated region and the second irradiated region are overlapped, and so the debris remaining on the processed surface of the processing object can be removed and extracted.

According to an embodiment of the laser processing apparatus, laser processing head and laser processing method, debris generated from the laser processing can be removed and extracted efficiently so that re-deposition of the debris on the processing object can be reduced.

Additional features and advantages are described herein, and will be apparent from, the following Detailed Description and the figures.

DETAILED DESCRIPTION

Hereinafter, embodiments are explained with reference to FIGS. 2 through 8. A laser processing apparatus used in the embodiments includes a laser light source and an optical system for optically projecting laser light emitted from the laser light source onto a processed surface of a processing object in a predetermined pattern, and so ablation processing is performed on the processed surface.

Figure 2:
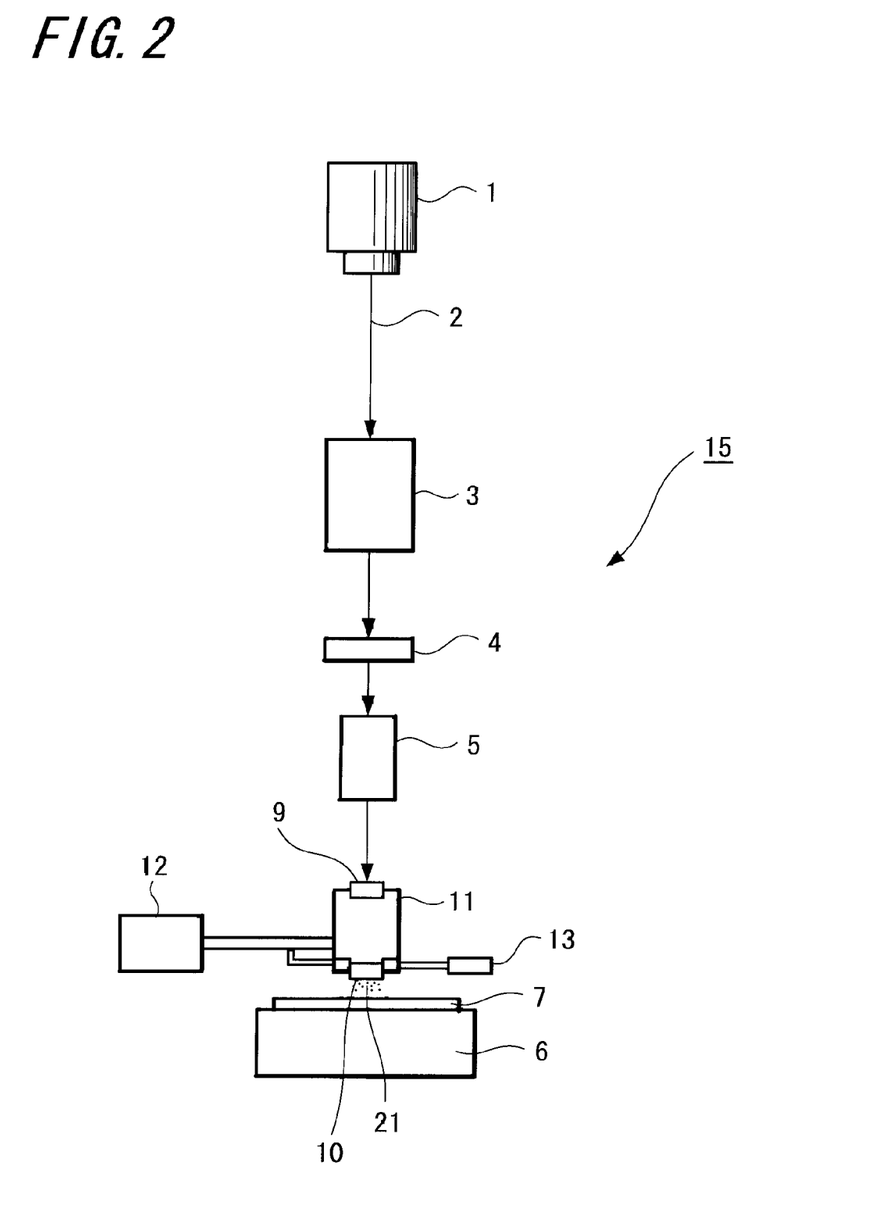
FIG. 2 is a schematic constitutional diagram of a laser processing apparatus according to an embodiment.

FIG. 2 is a diagram schematically showing an example of a configuration of a laser processing apparatus to which an embodiment is applied. A laser processing apparatus 15 shown in FIG. 2 is configured to have a laser light source 1, a beam shaper 3, a mask or variable aperture 4, a projection lens 5, a stage 6, a decompression chamber 11 (laser processing head), an outlet device 12 such as a roughing pump, and a gas inlet device 13. The laser processing apparatus 15 performs ablation processing on a processed surface of a processing object 7 by emitting a laser beam from the laser light source 1.

An excimer laser, for example, is used for the laser light source 1. There exist several types of excimer lasers each having different laser medium, such as XeF (351 nm), XeCl (308 nm), KrF (248 nm), ArF (193 nm) and $F_2$ (157 nm) in order of decreasing wavelength.

An oscillation wavelength of excimer laser is within the ultraviolet range, which is greatly different from those of a YAG laser (basic wave: 1.06 μm) performing processing by using thermal energy and $CO_2$ laser (10.6 μm). Essentially, an excimer laser is a pulse oscillation of a short pulse (between several ns and several tens ns). In addition, an excimer laser using a short pulse laser of short wavelength performs processing based on a photochemical decomposition and photothermal decomposition process called ablation which is not easily affected by temperature. Therefore, the finish of an edge of the processed surface becomes sharp. On the other hand, the YAG laser and $CO_2$ laser are greatly influenced by temperature, and the periphery of the processed portion may not be sharp without becoming an edged surface due to the thermal effect.

Further, an excimer laser beam has a cross section of about 10×10 mm immediately after emitted from the laser light source 1. The size of this laser beam can be reduced, elongated, or enlarged by the beam shaper 3 corresponding to the purpose of processing. With an enlarged cross section of the laser beam a comparatively wide area can be processed simultaneously. Therefore, the excimer laser is suitable for processing a large area simultaneously. When the laser beam is reduced in size, minute processing of high precision can be performed. Further, step-and-repeat patterning enables a comparatively wide area to be processed.

The beam shaper 3 shapes laser beams from the laser light source 1, equalizes beam intensity, and then outputs the laser beam.

The mask or variable aperture 4 has a predetermined pattern for passing or transmitting the laser beam shaped by the beam shaper 3. For example, a perforated mask formed of metal material, a photomask formed of transparent glass material and metal thin film, a dielectric mask formed of dielectric material and the like are used for this mask or variable aperture 4.

The projection lens 5 projects the laser beam passed through the pattern of the mask or variable aperture 4 with a predetermined magnification onto the processed surface of the processing object 7 mounted on the stage 6.

The stage 6 is disposed such that the laser beam projected from the projection lens 5 is focused on the processed surface of the processing object 7. This stage 6 has an X-Y stage structure, a three axes stage structure or the like capable of being moved and positioned along a plane vertical to an optical path 2 (optical axis) of the laser beam such that the processed surface of the processing object 7 can be scanned by the laser beam.

In the laser processing apparatus 15 having the above-described configuration, the processed surface of the processing object 7 is irradiated with a laser beam of a predetermined pattern using the excimer laser for the laser light source 1, and ablation processing is performed. On the processed surface of the processing object 7, debris corresponding with the material forming the processed surface is generated by the ablation process. Since there is a possibility that processing quality, processing accuracy and the like are affected when debris deposits on the processed surface, such deposition is prevented in an embodiment.

As shown in FIG. 2, the approximately cylindrical decompression chamber 11 (laser processing head) is provided on the laser optical path 2 immediately before the processing object 7 placed on the stage 6 and irradiated with the laser light. The cylindrical chamber is formed of aluminum, stainless steel, or the like and has an upper side transmission window 9 for transmitting the excimer laser, which is made of quartz in case of KrF laser and calcium fluoride in case of ArF laser, for example. The decompression chamber 11 is configured such that gas inside the decompression chamber 11 is discharged to the outside by the outlet device 12 and gas is directed inside the decompression chamber 11 by the gas inlet device 13. The decompression chamber 4 has a locally discharging function at a bottom portion 10.

The laser processing apparatus 15 according to an embodiment is disposed such that the bottom portion 10 of the decompression chamber 11 is provided in close proximity to the processing object 7 on which, for example, a transparent conductive film is formed. Then, an atmosphere in the vicinity of a laser irradiated surface of the transparent conductive film is discharged from an outlet hole. By doing so, the laser light irradiated surface of the transparent conductive film can be brought into a decompressed atmosphere by a simplified configuration and a sublimation pressure when the transparent conductive film is detached from a resin layer, for example, of a lower layer rises high during the laser light irradiation. As a result, irradiation energy used for the processing can be reduced and debris detached and removed from the resin layer by the laser light irradiation can be removed and extracted through the outlet hole. Extraction of debris detached from the resin layer is performed by a fluid feed apparatus (gas inlet device) for directing a fluid such as air onto a surface in the vicinity of a processed region.

Figure 3:
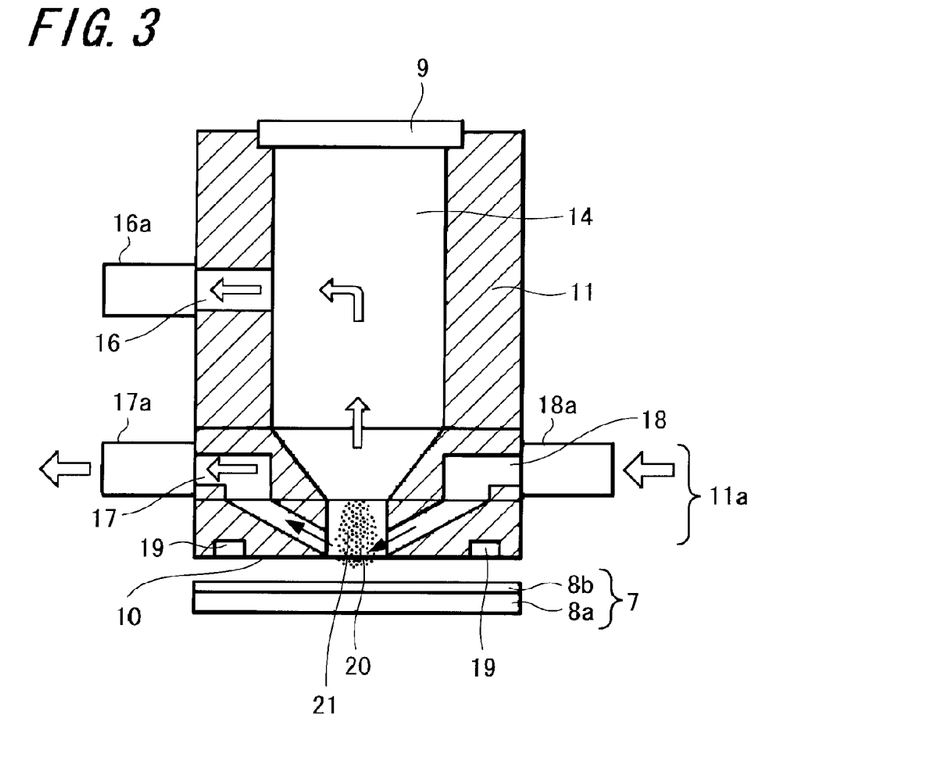
FIG. 3 is a schematic cross-sectional view of a decompression chamber according to an embodiment.
Figure 4:
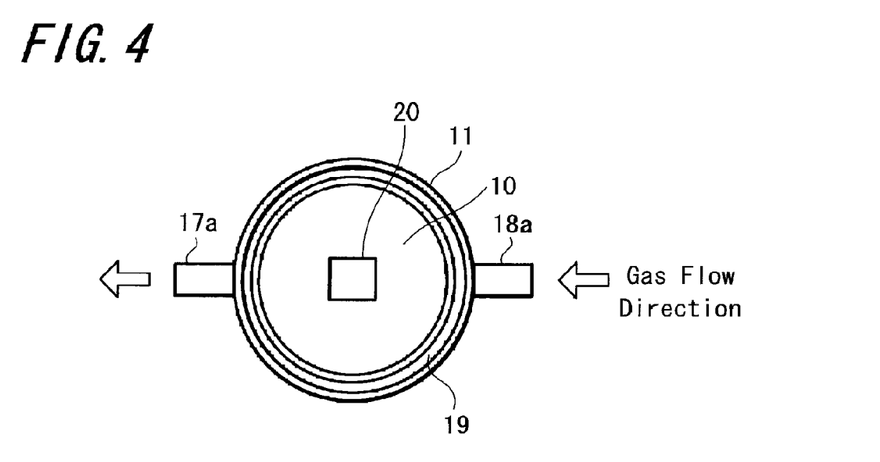
FIG. 4 is a bottom view (1) of a decompression chamber according to an embodiment.

FIG. 3 shows a schematic cross-sectional view of the decompression chamber 11 and FIG. 4 shows a bottom view of the decompression chamber 11, respectively. The decompression chamber 11 has an approximately cylindrical shape in which a transmission hole 14 is formed in the center portion, and is disposed at a predetermined distance from the surface of the processing object 7 in which a multilayer film including a transparent conductive film 8b is formed on a substrate 8a, for example. The transparent conductive film 8b constituting the multilayer film is formed on a resin layer (not illustrated) or the like, for example. However, it should be appreciated that the transparent conductive film may be formed in any suitable manner without limiting to this example.

The decompression chamber 11 includes an upper side portion and a lower side portion, and an outlet hole 16 continuous with the transmission hole 14 is formed in the upper side portion and is connected to the outlet device 12 through a piping 16a. In the lower side portion of the decompression chamber 11, vent holes 17 and 18 are provided and are continuous with the transmission hole 14 and opposing each other. In addition, an opening portion 20 for passing the laser light transmitted through the upper side transmission window 9 is provided in approximately the center of the bottom portion 10 of the decompression chamber 11. A gas flowing groove 19 (refer to FIG. 4) is provided on a concentric circle in the periphery of the bottom portion of the decompression chamber 11. The vent hole 17 is connected to the outlet device 12 through a piping 17a, and the vent hole 18 is connected to the gas inlet device 13 through a piping 18a. The vent holes 17 and 18 are connected to a space in the vicinity of the opening portion 20 at a predetermined angle with respect to the bottom portion 10 so that a gas flows into the vicinity of the laser light irradiated portion of the processing object 7 and an atmosphere in the vicinity of the laser light irradiated portion is discharged. In this embodiment, the lower side portion of the decompression chamber 11 provided with the vent holes 17, 18 and the opening portion 20 is called a gas inlet-outlet portion 11a.

The atmosphere around the surface of the processing object 7 is discharged through the outlet hole 16 and the vent hole 17 by evacuating (in this embodiment up to around $10^{-2}$ Torr at maximum) the inside of the decompression chamber 11 using the outlet device 12 externally attached to the decompression chamber 11. A diameter of the opening portion 20 is approximately equal to or somewhat larger than a maximum processing beam size. For example, the diameter is set to the maximum processing beam size plus 1 mm or less.

Gas supplied from a flotation gas inlet device (not illustrated) flows from the circular gas flowing groove 19, and so a distance between the bottom portion 10 of this decompression chamber 11 and the irradiated surface (multilayer film surface) of the processing object 7 is maintained equal to or less than 100 μm. Therefore, conductance when discharging through the outlet hole 16 and vent hole 17 becomes small, and a vacuum level becomes less than one barometric pressure in the space between the bottom portion 10 of the decompression chamber 11 and the processing object 7. With respect to the transparent conductive film 8b irradiated and removed by the laser light under this decompressed condition, the sublimation pressure when detached from an interface with, for example, a resin layer (not illustrated) of the lower layer rises higher than the case of a laser light irradiation at one barometric pressure. Accordingly, an irradiation energy density of the laser light can be reduced. Further, the removed debris from the transparent conductive film 8b is extracted through the outlet hole 16 and the vent hole 17.

Note that, although not illustrated in the figures, filters are provided for the outlet device 12 and the outlet hole to extract debris. Further, it is also possible to discharge gas and debris from the outlet hole 16 and the vent hole 17 individually by switching the piping in the discharge device 12. Furthermore, it is also possible to discharge gas and debris from the outlet hole 17 and the vent hole 16 by providing two discharge devices individually.

Thus, the laser light irradiated surface is brought into the decompressed atmosphere by a simplified configuration provided with the locally discharging function. The laser light irradiation is performed under this decompressed atmosphere, and so the processing energy can be reduced and debris can be removed and extracted without impairing the productivity.

Figure 5A:
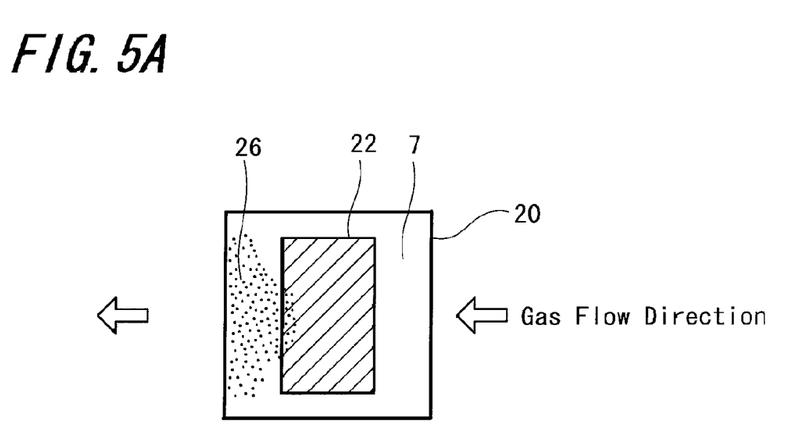
FIGS. 5A and 5B are diagrams showing an example of scattering debris according to an embodiment.
Figure 5B:
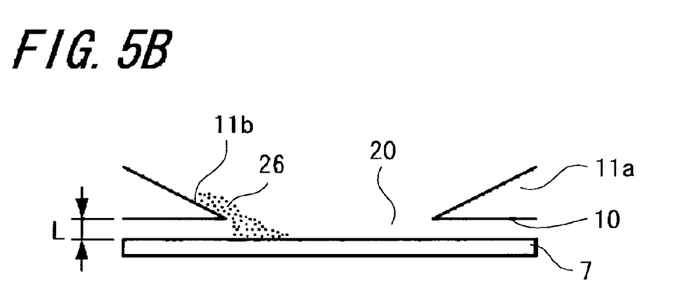

FIGS. 5A and 5B are diagrams showing an example of debris scattered when performing laser processing according to an embodiment, in which FIG. 5A is a top view showing the vicinity of the processed region and FIG. 5B is a lateral view showing the vicinity of the processed region. As shown in FIG. 4 of this embodiment, when performing the laser processing, gas flows into the decompression chamber 11 (laser processing head) from the vent hole 18 through the piping 18a and is discharged almost simultaneously from the outlet hole 16 and the vent hole 17 through the piping 16a and 17a. Therefore, the gas flow shown in FIG. 4 is generated in the vicinity of the laser light irradiated region of the processing object 7. When a predetermined processed region of the processing object 7 is irradiated by the laser light at this time, debris 26 not completely discharged from the outlet hole 16 and the vent hole 17 is blown by the gas flow and deposits on one side (the left side of the irradiated region 22 in the example of FIG. 6) around a irradiated region 22 (refer to FIG. 5A).

As described above, the diameter of the opening portion 20 of the decompression chamber 11 and the distance L between the bottom portion 10 of the decompression chamber 11 and the irradiated surface of the processing object 7 are adjusted (set) appropriately. With this, an area where the debris 26 is deposited around the processed region can be reduced. Further, a deposited amount thereof onto the processing object 7 can be controlled, because the debris is deposited on a slope 11b around the opening portion 20 even when scattered around the processed region.

Thus, a scattered range of the debris 26 generated by the ablation processing using the laser light is controlled by the opening portion 20 and the debris 26 is caused to deposit around the opening portion 20, and so the debris 26 can be prevented from re-depositing on the surface of the processing object 7.

Figure 6:
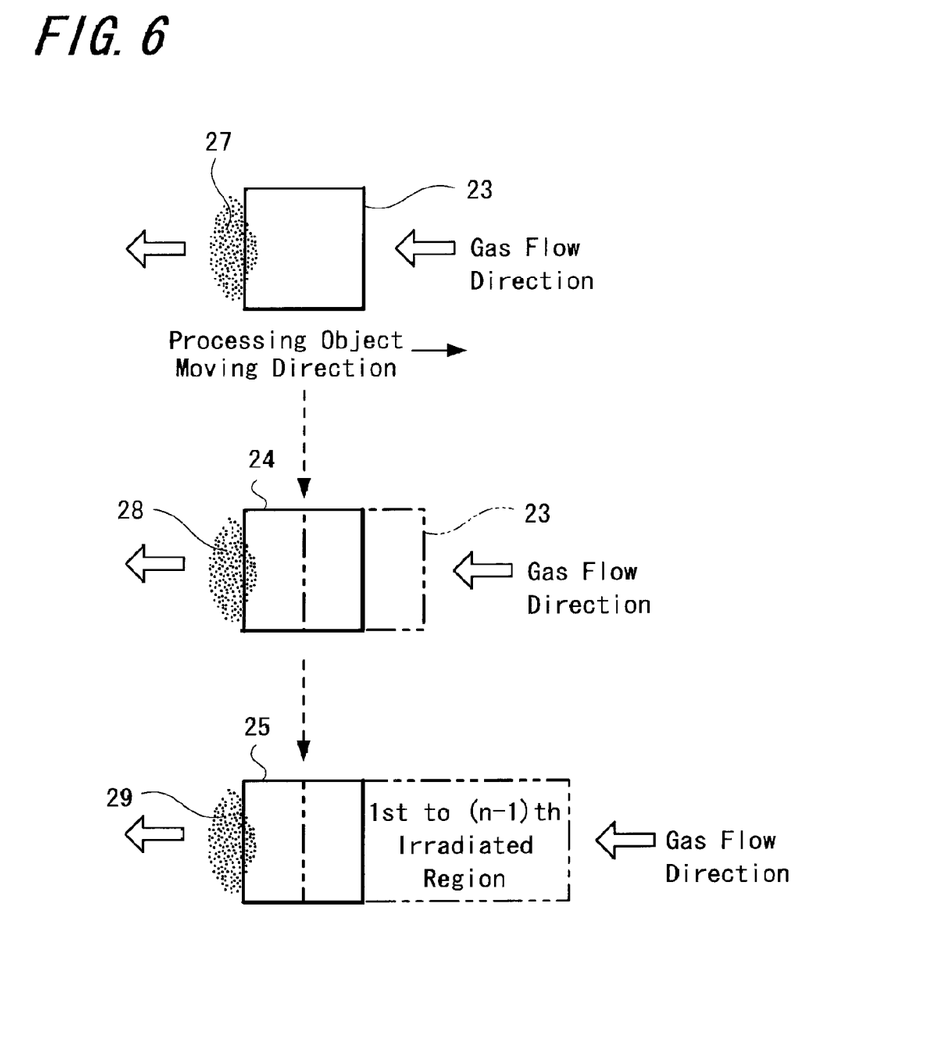
FIG. 6 is a diagram for explaining a laser processing method according to an embodiment.

Next, a laser processing method according to an embodiment is explained with reference to FIG. 6. FIG. 6 shows a processing method in which debris not removed by a first-shot laser beam (first laser light) is irradiated by a second-shot laser beam (second laser light) in a overlapped manner while gas flowing into a pattern processing direction of the processing object 7.

First, a discharge flow amount from the outlet hole 16 and vent hole 17 and a gas flow amount into the vent hole 18 are adjusted to control an inner pressure of the decompression chamber 11 under a predetermined decompressed condition. After that, a flotation gas is blown from the gas flowing groove 19 so that the distance between the bottom surface 10 of the decompression chamber 11 and the processed surface of the processing object 7 is maintained to be constant.

Further, gas flows into the vicinity of the laser processed region such that a gas flow can be generated in a direction from the right to the left in FIG. 6, and the region is irradiated by the first laser light. Approximately at the same time discharge is performed. Debris 27 is deposited on the lift side of a first irradiated region 23 of the processing object 7 irradiated by the laser light. Next, the stage 6 on which the processing object 7 is mounted is moved in the pattern processing direction, specifically, in the direction opposite to the gas flow in this embodiment. Then, similarly to the above, the processing object 7 is irradiated by a laser beam such that the first irradiated region 23 by the first-shot laser beam is partially overlapped, for example 50%, with a second irradiated region 24 by the second-shot laser beam while gas flowing into the vicinity of the laser light irradiated region of the processing object 7 and the atmosphere being discharged.

The debris 27 generated by the first-shot laser beam and re-deposited can be removed and extracted from the outlet hole 16 and the vent hole 17 by performing the overlapped irradiation. At this time, debris 28 is newly generated in the gas flow direction, that is, on the left side of the second irradiation area 24.

Similarly, the stage 6 on which the processing object 7 is mounted is moved in the direction opposite to the gas flow (moved in the pattern processing direction) and irradiation of the laser beam is performed. After such process was repeated up to irradiation of an n-th shot of the laser beam, debris 29 is deposited on the leeward side of the gas flow in an n-th irradiated region. Also, debris re-deposited on the first through (n−1)th irradiated regions by the first through (n−1)th shots can be removed and extracted.

It should be noted that an overlapped amount of processing beams is, for example, about 50% in this embodiment. However, it should be appreciated that the overlapped amount is not limited to this amount. In addition, oxygen ($O_2$), helium (He), argon (Ar) or the like is used as the gas that is brought into a processed region from the gas inlet device 13 in this embodiment.

Figure 7:
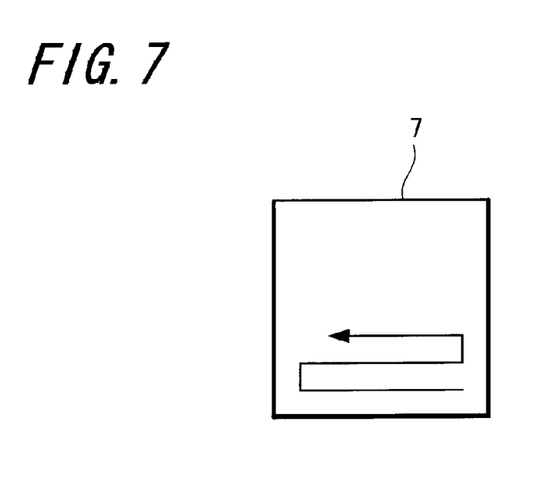
FIG. 7 is a diagram showing an example of a laser processing route according to an embodiment.

Next, another embodiment is explained. Since the processing object 7 is in practice an array substrate (multilayer film substrate) of a flat panel display or the like, the pattern processing direction, specifically, the laser irradiation route may need to be changed a plurality of times as shown in FIG. 7. In such case, with respect to the vent hole 17, the function of directing gas into the vicinity of the laser light irradiated region is added to the function of discharging the atmosphere in the vicinity of the laser light irradiated region of the processing object 7. Further, with respect to the vent hole 18, the function of discharging the atmosphere in the vicinity of the laser light irradiated region of the processing object 7 is added to the function of directing the gas into the vicinity of the laser light irradiated region of the processing object 7. Accordingly, the gas inlet-to-outlet direction between the vent hole 17 and the vent hole 18 can be switched over correspondingly to the pattern processing direction of the processing object 7. As an example, there is such a configuration that the vent hole 17 and the vent hole 18 are connected to the discharge device 12 and to the gas inlet device 13 respectively and an opening-closing mechanism such as an electromagnetic valve is provided in the middle of each connection path so that the gas inlet-to-outlet direction is switched over by controlling the opening and closing of the opening-closing mechanism.

Specifically, when the laser processing is performed from the right to left in FIG. 7, gas is set to flow in the direction from the right to left (from the piping 18a to the piping 17a) as shown in FIG. 4. Further, gas is set to flow in the direction from the left to right (from the piping 17a to the piping 18a) in FIG. 4 when the laser processing is performed from the left to right after changing the laser processing direction.

Thus, switching the direction of the fluid that flows between the vent holes 17 and 18 formed in the gas inlet-outlet portion 11a is controlled correspondingly to the pattern processing direction. Therefore, if the pattern processing direction is changed, the gas flow direction can be adjusted. Next, another embodiment is explained.

First, a rotation mechanism having a rotational axis approximately parallel with an optical path of laser light is provided in the gas inlet-outlet portion 11a, where the vent holes 17 and 18 are formed, on the lower side of the decompression chamber 11 (laser processing head). Then, the direction of the inlet and outlet of the gas that flows between the vent holes 17 and 18 in the vicinity of the laser light irradiated region of the processing object 7 can be switched over by rotating the gas inlet-outlet portion 11a correspondingly to the pattern processing direction of the processing object 7. Accordingly, the gas flow direction can be adjusted in accordance with the shift of the pattern processing direction (refer to FIG. 7). With such configuration, the gas flow direction can be switched over easily and automatically.

Referring to FIG. 4, for example, the decompression chamber 11 is rotated by 180 degrees so that the gas flow direction is reversed from the left to the right when the pattern processing direction is shifted by 180 degrees. In addition, the decompression chamber 11 is rotated by 90 degrees in the clockwise direction so that the gas flow direction is changed to a top-to-bottom direction in the case where the pattern processing is performed in a bottom-to-top direction in FIG. 4. Although the gas inlet-outlet portion 11a, which is only a part of the decompression chamber 11, is rotated in the above explanation, it should be appreciated that the whole of the decompression chamber 11 may be rotated in this manner.

Figure 8:
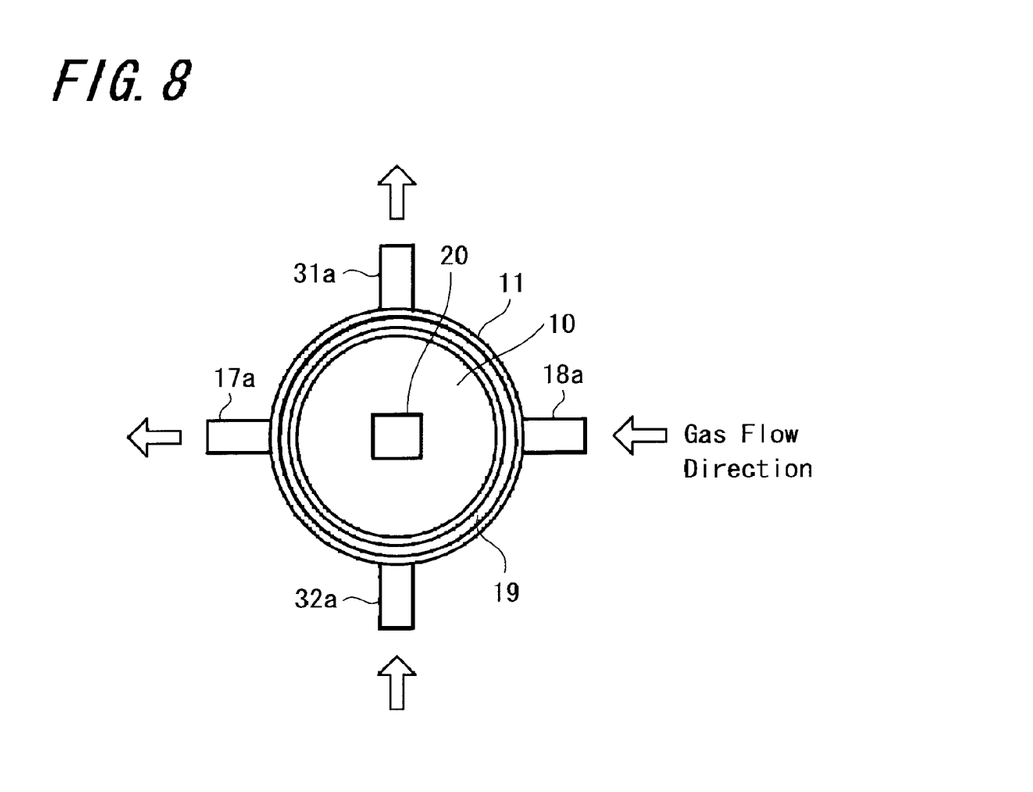
FIG. 8 is a bottom view (2) of a decompression chamber according to an embodiment.

Further, another embodiment, is explained. FIG. 8 is a bottom view of the decompression chamber 11 according to this embodiment. According to the embodiment of FIG. 8, another combination of the gas inlet and outlet mechanism shown in FIG. 4 is further disposed by 90 degrees on the circumference of the decompression chamber 11 so that time for switching the gas flow direction can be shortened in the patterning in two directions of X-direction and Y-direction.

In the decompression chamber 11 (laser processing head) in FIG. 8, piping 31a and 32a, specifically, third and fourth vent holes, are formed in a manner being opposed each other and also at positions by 90 degrees from the piping 17a (vent hole 17) and the piping 18a (vent hole 18) respectively so as to direct gas into the vicinity of the laser light irradiated region of the processing object 7 or to discharge the atmosphere in the vicinity of the laser light irradiated region. Accordingly, corresponding to the pattern processing direction of the processing object 7, the use of either a pair of the vent holes 17 and 18 or a pair of the third and fourth vent holes (piping 31a and 32a) is selected and used, and further switched.

Since vent holes are provided at every 90 degree increment according to this embodiment, there is no need to rotate the decompression chamber 11 when the processing direction is switched over during the patterning. Also, the switching time can be shortened. In addition, by requiring rotational movement, any errors resulting from machine accuracy can be prevented. Accordingly, highly accurate pattern processing can be performed in comparison to the embodiment of FIG. 4.

According to the embodiments, the thermal effect is reduced during the laser processing based on the ablation or thermofusion by the laser light. Therefore, debris generated by the laser processing can be removed and extracted efficiently so that the amount of debris re-deposited on the processed surface can be reduced as described above.

As a result, such excellent effectiveness as accurate laser processing and prevention of debris deposited can be obtained, and so application of the laser processing is expanded and a minute pattern can be formed at low costs while maintaining high accuracy.

It should be noted that although various technical definitions such as the kind of materials and the numerical values are given, the scope of the present invention is not limited to those examples unless there is a specific description to the effect that the present embodiments are limited thereto.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A laser processing apparatus for performing pattern processing of a transparent conductive film on a multilayer film formed on a processing object by using laser light, comprising:
   a laser processing head including:
      a transmission window for transmitting laser light by which said processing object is irradiated;
      a grouping of gas inlets and outlets consisting of:
         an opening portion for passing the laser light transmitted through said transmission window to a bottom portion of said laser processing head,
         an outlet hole for discharging an atmosphere to the outside, the outlet hole being positioned at a top portion of the laser processing head and away from a surface of the processing object,
         a first vent hole for directing gas into the vicinity of the laser light irradiated region of said processing object, the first vent hole positioned adjacent to the surface of the processing object near the bottom portion of the laser processing head, and
         a second vent hole provided for discharging the gas in the vicinity of the laser light irradiated region of said processing object to the outside, the second vent hole positioned adjacent to the surface of the processing object near the bottom portion of the laser processing head and at a position opposed to the first vent hole, the second vent hole positioned directly below the outlet hole; and a gas flowing groove peripherally located at the bottom portion of said laser processing head, wherein debris generated from the laser light irradiated region of said processing object is discharged upwardly through the opening portion of the laser processing head and out of the outlet hole, and out of the second vent hole, both the outlet hole and the second vent hole being continuous with said opening portion provided at the bottom portion of said laser processing head, and wherein a horizontal gas flow direction is in the direction from the first vent hole to the second vent hole, and the grouping of gas inlets and outlets are arranged such that within each of the interiors of the laser processing head, the first vent hole, the second vent and the outlet hole, at least substantially none of the gas flows in a direction opposite to the horizontal gas flow direction.

2. A laser processing apparatus according to claim 1, wherein an amount of said debris deposited on said processing object is controlled by adjusting a diameter of the opening portion of said laser processing head and by adjusting a distance between said multilayer film surface of said processing object and the bottom portion of said laser processing head.

3. A laser processing apparatus according to claim 1, wherein said first vent hole discharges the atmosphere in the vicinity of said laser light irradiated region and also directs the gas into the vicinity of the laser light irradiated region of said processing object, wherein said second vent hole directs the gas into the vicinity of the laser light irradiated region of said processing object and also discharges the atmosphere in the vicinity of the laser light irradiated region of said processing object, and wherein a gas inlet-to-outlet direction between said first vent hole and said second vent hole is changed correspondingly with a change in the pattern processing direction of said processing object.

4. A laser processing apparatus according to claim 1, wherein the gas flowing groove is provided on a concentric circle in the periphery of the bottom portion of said laser processing head.

5. A laser processing apparatus for performing pattern processing of a transparent conductive film on a multilayer film formed on a processing object by using laser light, comprising:

a laser processing head including:
a transmission window for transmitting laser light by which said processing object is irradiated;

a grouping of gas inlets and outlets consisting of:
an opening portion for passing the laser light transmitted through said transmission window to a bottom portion of said laser processing head,
an outlet hole for discharging an atmosphere to the outside, the outlet hole being positioned at a top portion of the laser processing head and away from a surface of the processing object,
a first vent hole for directing gas into the vicinity of the laser light irradiated region of said processing object, the first vent hole positioned adjacent to the surface of the processing object near the bottom portion of the laser processing head, and
a second vent hole provided for discharging the gas in the vicinity of the laser light irradiated region of said processing object to the outside, the second vent hole positioned adjacent to the surface of the processing object near the bottom portion of the laser processing head and at a position opposed to the first vent hole, the second vent hole positioned directly below the outlet hole; and
a gas flowing groove peripherally located at the bottom portion of said laser processing head, and
a rotation mechanism that is provided with said first and second vent holes and that has a rotational axis approximately parallel with an optical path of said laser light, wherein debris generated from the laser light irradiated region of said processing object is discharged upwardly through the opening portion of the laser processing head and out of the outlet hole, and out of the second vent hole, both the outlet hole and the second vent hole being continuous with said opening portion provided at the bottom portion of said laser processing head, wherein the rotational mechanism is configured to change a gas inlet-to-outlet direction between said first vent hole and said second vent hole in the vicinity of said laser light irradiated region of said processing object by rotating said rotation mechanism correspondingly with a change in the pattern processing direction of said processing object, and wherein a horizontal gas flow direction is in the direction from the first vent hole to the second vent hole or from the second vent hole to the first vent hole, and the grouping of gas inlets and outlets are arranged such that within each of the interiors of the laser processing head, the first vent hole, the second vent and the outlet hole, at least substantially none of the gas flows in a direction opposite to the horizontal gas flow direction.

\* \* \* \* \*